B. GORDON, Jr.
WEIGHING AND MARKING DEVICE.
APPLICATION FILED MAY 26, 1916. RENEWED MAY 14, 1919.
1,315,769.
Patented Sept. 9, 1919.
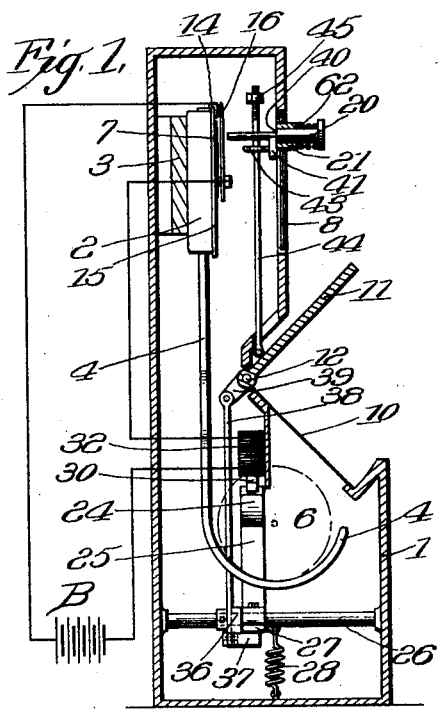
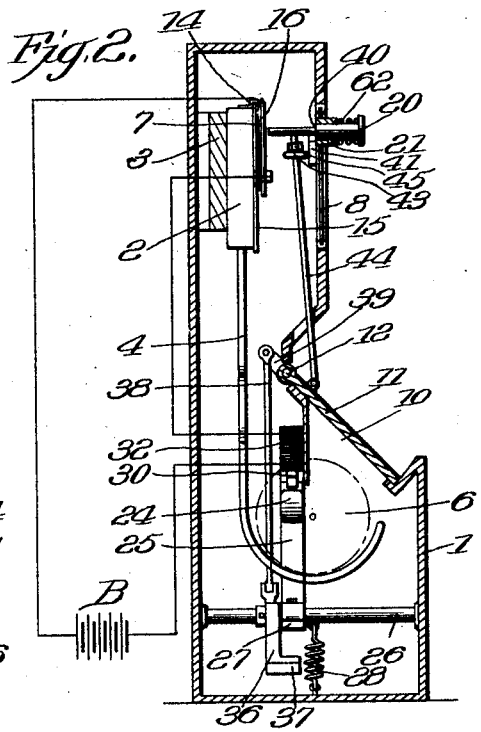
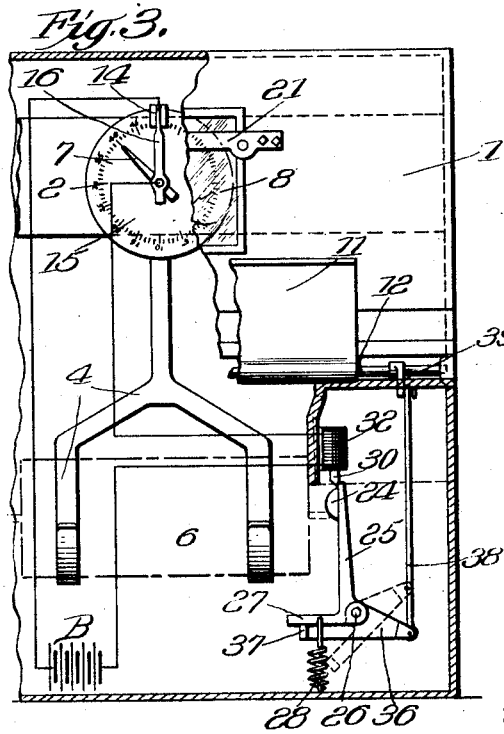
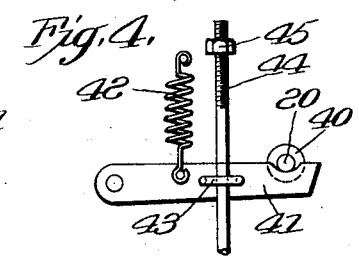
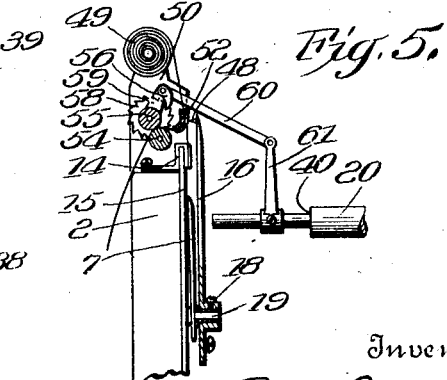
Inventor
Beirne Gordon Jr.
By his Attorney
Alfred Wilkinson

UNITED STATES PATENT OFFICE.

BEIRNE GORDON, JR., OF UTICA, NEW YORK.

WEIGHING AND MARKING DEVICE.

1,315,769.  Specification of Letters Patent.  Patented Sept. 9, 1919.

Application filed May 26, 1916, Serial No. 100,167. Renewed May 14, 1919. Serial No. 297,155.

*To all whom it may concern:*

Be it known that I, BEIRNE GORDON, Jr., a citizen of the United States, residing at Utica, in the county of Oneida and State of New York, have invented new and useful Improvements in Weighing and Marking Devices, of which the following is a specification.

This invention relates to a weighing and marking apparatus particularly adapted for marking lap rolls as they come from the picker rooms preparatory to being passed to the carding machines in yarn mills. My improved machine is designed automatically to mark the laps which are of proper weight and is of an arrangement which will not permit of the operator in any manner manipulating the scale or marking device for improperly marking laps which are not of the proper weight.

As is well known it is the common practice to employ an automatic stop in connection with the finished picker machines of the picker room which operate to stop the feeding mechanism when a predetermined number of yards of lap have been wound upon the roll. The rolls of the length so determined are then weighed to ascertain if the lap is of the desired weight per yard for it is essential that there be as little variation yard by yard in the laps as possible. As an instance if the picker is set to produce lap of sixteen ounces to the yard for a forty-yard length of lap, each lap roll should weigh forty pounds. Should there be more than one-half pound variation, more or less, the lap should be run over and adjustments if required should be made. The degree of variation permitted, is of course governed by the manufacturer to suit the individual requirements. However it is always a troublesome factor to get a picker man who can be relied on to make the proper rejections.

In my improved apparatus the marking of the lap rolls of proper weight is effected automatically and entirely beyond the control of the operator. Moreover it is arranged that when the marking device is operative the parts are inaccessible to the operator thus to insure against manipulation for false marking. A further feature of my invention consists in associating with the weighing and marking devices suitable means for recording the number of lap rolls of proper weight thus affording an additional check upon the mill operation.

A desirable embodiment of my invention is shown in the accompanying drawing wherein like reference numerals are applied to the corresponding parts in the several views. In the drawings Figure 1 is a vertical, sectional view of a desirable form of my improved apparatus; Fig. 2 is a similar sectional view with the parts in changed position; Fig. 3 is a view in front elevation with a portion of the housing removed. Fig. 4 is a detail view in rear elevation of the marker release control and Fig. 5 is a detail view illustrating a suitable recording means associated with the marker device.

In the approved form of my invention here shown, the operating parts are inclosed by a suitable housing 1 within which is supported a suitable scale 2 mounted on a supporting beam 3. The scale shown is of the dial type and the balance beam 4 thereof is forked and curved at its lower end to form a receptacle adapted to receive the lap roll 6 for weighing. The pointer 7 of the scale in the customary manner will assume a position with relation to the graduated face of the dial to indicate the weight of the lap roll and may be observed by the operator through a window 8 in the housing.

The lap roll to be weighed is placed directly upon the beam of the scale through a front opening 10 in the housing which is provided with a door or cover 11 hinged at 12 on the housing. In a manner hereinafter described it is arranged that this door must be closed to accomplish the marking of the lap roll so that the scales cannot be in any manner manipulated for improper marking.

In accordance with my invention I provide an electric terminal piece 14 supported on the dial 15 of the scale and adapted to coact with a pointer contact finger 16 adjustably secured to the scale pointer 7 for closing a marker actuating circuit. This contact finger 16 is insulated from but supported on the pointer spindle 19 and secured by a set screw 18 and by adjusting its relation to the pointer 15 it may be made to assume a position to make contact with the co-acting terminal 14 when the pointer 7 registers at any weight desired. The contact finger 16 as indicated is connected to one leg of a circuit from battery B and the other leg of the circuit is connected as indicated to the terminal piece 14. This latter terminal piece is of a size to be engaged by the movable contact finger 16 within a range of movement of the latter proportionate to the limit of variation from the weight set that it may be desirable to allow. Conforming to the illustration hereinbefore given, this terminal finger will be set to be in registering position with contact 14 when the pointer 7 registers with forty pounds on the scale and is of a width to be engaged by the finger within one half pound variation either way.

As shown, the movable contact finger is arranged normally to be out of position for making contact with the terminal piece 14 and suitable means are provided to force it into contact when it is desired to mark the lap roll. For this purpose I provide an exteriorly extending presser or plunger 20 fitted to a bearing piece 21 supported on the housing. The inner end of the presser 20 is positioned to engage the contact finger 16 when in registering position with contact 14 so that upon pressing inwardly the presser will force the finger into contact with the terminal 14 to close the circuit; the finger 16 being of suitable resilient metal to permit of this operation. As will be readily understood if the lap roll is either too heavy or too light the finger 16 and contact 14 will not be in proper relative position to then engage, and the circuit will not be closed.

The marker consists of a color pad 24 carried on a bell-crank-arm 25 fixed on a rock shaft 26 journaled at its ends in the housing. The bell-crank 25 has an arm 27 to which a retractile spring 28 is attached whereby the influence of the spring on the marker is to rock it into engagement with the lap roll on the scale. Normally it is held against being so moved by a latch 30 as shown in Fig. 1. The latch 30 is formed by the core of a solenoid magnet 32 wound in series with the circuit from battery B through the contacts 14 and 16. In consequence, upon closing of the circuit the latch 30 will be raised and the marker released to be actuated by spring 28.

The resetting of the marker is effected by opening of the door 11, for removing the lap roll after each marking operation. For this purpose a setting arm 36 is journaled on the rock shaft 26 and provided with a shoulder 37 to underlie the fixed arm 27 and this arm 36 is connected to the hinged door as shown by a connecting rod 38 connected to an arm 39 affixed on the pivotal shaft 12 of the door. Thus when the door is opened the arm 36 will raise the arm 27 with it to reset the marker arm 25 behind the latch 30 and to further energize the spring 28. When the door is closed the arm 36 is suitably lowered to permit of the marker operating.

The means employed to prevent operation of the marker except when the door 11 is fully closed is here shown best in Figs. 1, 2 and 4. As shown, the presser 20 for closing the switch 14—16 is formed with an inwardly directed shoulder 40 formed by reducing the diameter of the presser at its inner end. Arranged to be engaged by this shoulder there is provided a stop arm 41 pivotally supported upon bearing piece 21. A retractile spring 42 is connected to act on the stop 41 as shown normally to elevate it into the position shown in Figs. 1 and 4 where it will prevent the presser 20 being moved inwardly so that the marker cannot then be operated. A suitable eyelet 43 is carried on the stop arm and a rod 44 pivotally connected to the door 11 is passed through the eyelet and provided with a nut 45, threaded on its upper end. As indicated in Fig. 2 the nut 45 is adjusted on the rod 44 to engage the eyelet immediately before coming to its fully lowered position whereby the stop arm is depressed and the presser released to then permit of the marker being operated. Also as indicated the housing is so formed that the opening will be closed before the release of the presser as described.

From the foregoing description it will be understood that in using my improved device the operator will place the lap-roll upon the scale and observe the weight through window 8. If of proper weight he will then close the door and complete the marker circuit by means of the presser 20. If not of proper weight he will of course remove the lap-roll and make the necessary adjustments to the picking machines. When the lap roll is of correct weight and the presser operated to close the circuit the latch 30 will release the marker 24 to engage and mark the roll. The marker pad may contain suitable powdered color or may be linked for this purpose. When the marking is so completed the door will be opened to remove the lap and reset the marker as described.

As an additional feature I may desirably employ a suitable automatically operating recording means associated with the marker controlling mechanism so as to record the number of laps of correct weight which have been weighed. A desirable arrangement therefor is shown in Fig. 5 and consists in elongating the contact finger 16 and providing it with a pin 48 adapted to perforate a recording paper strip when pressed inwardly to close the marker circuit. The paper may be marked if desired and is shown fed from a spool 49 supported on a suitable frame 50. The paper from the roll is passed downwardly through a two part apertured pad frame 52 to suitable feed rollers 54—55. The feed rollers are actuated to advance the strip after each recording and marking operation by means of a dog 56 engaging a ratchet 58 on one of the rollers. The dog is supported on a suitably journaled arm 59 connected by a link 60 to a bracket 61 affixed to the presser by a set screw. Thus upon each return movement of the presser, which is effected by the coil spring 62 engaging the outer end thereof, the feed rollers will be given a partial turn to impart a short movement to the paper strip.

In the construction as described it will be seen that the recording parts are beyond the reach of the operator so that there can be no manipulation to the end of false marking of the lap rolls. Thus in the use of my device anyone supervising the operation can with a casual glance learn if a lap roll is of proper weight for if not marked it is either off weight or has not been weighed.

Having described my invention I claim:

1. An apparatus of the character described comprising a suitable housing, weighing means, a marking device, said weighing means and marking device being associated whereby the operation of the marking device is dependent upon the position of the weighing means, and protecting means adapted to assume a protecting position to prevent access to the article being weighed and to prevent manipulation of the weighing means and movable to a non-protecting position, and connections from the protecting means to the marking device adapted to prevent the operation of the latter when the protecting means is in non-protecting position.

2. An apparatus of the character described comprising a suitable housing, weighing means, a marking device, said weighing means and marking device being associated whereby the operation of the marking device is dependent upon the position of the weighing means, means to adjust the operative relation of the weighing means and the marking device, and protective means operative in one position to prevent access to the article being weighed and to prevent manipulation of the weighing means and movable to a non-protecting position, and connections from the protecting means to the marking device adapted to prevent the operation of the latter when the protecting means is in non-protecting position.

3. An apparatus for the marking of articles of proper weight comprising weighing means and a marking device associated therewith, electro-magnetic means for controlling the operation of the marking device, an energizing circuit therefor, a movable contact member in said circuit connected with a movable part of the weighing means to be positioned thereby and a coacting contact piece adapted to be engaged by said movable contact when correctly positioned, and protecting means operative in one position to prevent access to the article being weighed and to prevent manipulation of the weighing means and movable to a non-protecting position, and connections from the protecting means to the marking device adapted to prevent the operation of the latter when the protecting means is in non-protecting position.

4. An apparatus for the marking of articles of proper weight, comprising weighing means and a marking device associated therewith to be operatively dependent thereon, an inclosing housing to inclose the article and marking device during the marking operation, said housing having an opening for the passage of the article and a closing door therefor and connections from the door operative to prevent the operation of the marking device unless the door is closed substantially as described.

5. An apparatus of the character described comprising a suitable housing, weighing means, a marking device associated therewith, protecting means adapted in one position to prevent access to the article being weighed and to prevent manipulation of the weighing means and movable to a non-protecting position, connections from the protecting means to the marking device adapted to prevent the operation of the latter when the protecting means is in non-protecting position and recording means operatively connected to the marking means to record the number of articles marked.

6. An apparatus of the character described comprising a suitable housing, said housing having an opening and a door for the opening, weighing means, a marking device, retaining means for the marking device associated with the weighing means to be released thereby when the article is of proper weight, actuating means for the marking device and means operatively connected to the door adapted to reset the marker actuating means upon opening of the door, substantially as described.

7. An apparatus for the weighing and marking of articles having in combination, weighing means, a marker arm journaled in position to be rocked into engagement with the end of the article, a spring normally to rock the marker arm into engagement, a magnetically controlled latch adapted to retain the marker arm in position of non-engagement and to release the arm upon being energized, an energizing circuit for the magnet, a movable contact member adjustably secured to the pointer of the scale and a fixed contact member to coact therewith connected in series with the magnet circuit, said movable contact member being resiliently held out of contact, a presser for forcing the contacts into engagement when correctly positioned, a housing for the scale and marking device, having an opening to admit the lap roll, a door for closing the opening and connections from the door to the marker arm adapted to reset said arm behind the magnet latch upon opening of the door substantially as described.

8. An apparatus for the weighing and marking of articles having in combination, weighing means, a marker arm journaled in position to be rocked into engagement with the end of the article, a spring normally to rock the marker arm into engagement, a magnetically controlled latch adapted to retain the marker arm in position of non-engagement and to release the arm upon being energized, an energizing circuit for the magnet, a movable contact member adjustably secured to the pointer of the scale and a fixed contact member to coact therewith connected in series with the magnet circuit, said movable contact member being resiliently held out of contact, a presser for forcing the contacts into engagement when correctly positioned, and suitable housing for the scale and marking device substantially as described.

9. An apparatus of the character described having in combination a scale having an indicating dial, a pointer movable with relation thereto and a depending weighing beam of a form to provide a receptacle to receive the lap roll, a marker arm journaled in position to be rocked into engagement with the end of the lap roll, a spring normally to rock the marker arm into engagement, a magnetically controlled latch adapted to retain the marker arm in position of non-engagement and to release the arm upon being energized, an energizing circuit for the magnet, a movable contact member adjustably connected to the pointer of the scale and a fixed contact member to coact therewith connected in series with the magnet circuit, said movable contact member being resiliently held out of contact, a presser for forcing the contacts into engagement when correctly positioned, a housing for the scale and marking device having an opening to admit the lap roll, a door for closing the opening, connections from the door to the presser to permit the presser to be operated only when the door is closed and connections from the door to the marker arm adapted to reset said arm behind the magnet latch upon opening of the door substantially as described.

10. An apparatus of the character described having in combination a scale having an indicating dial, a pointer movable with relation thereto and a depending weighing beam of a form to provide a receptacle to receive the lap roll, a marker arm journaled in position to be rocked into engagement with the end of the lap roll, a spring normally to rock the marker arm into engagement, a magnetically controlled latch adapted to retain the marker arm in position of non-engagement and to release the arm upon being energized, an energizing circuit for the magnet, a contact member adjustably secured to the pointer of the scale and a fixed contact member to coact therewith connected in series with the magnet circuit, said movable contact member being resiliently held out of contact, a compressor for forcing the contacts into engagement when correctly positioned, a housing for the scale and marking device, having an opening to admit the lap roll and a window to observe the scale, a door for closing the opening, connections from the door to the presser adapted to permit the presser to be operated only when the door is closed, connections from the door to the marker arm adapted to reset said arm behind the magnet latch upon opening of the door and a recording device associated with the scale, comprising a paper strip supply roll suitably journaled, feeding means for the strip, actuating connections therefor connected to the presser, a perforating pin on the movable contact member and means for supporting the paper strip in position to be perforated by said pin when contact is made substantially as described.

11. An apparatus of the character described comprising a suitable housing, said housing having an opening and a door for the opening, weighing means, a marking device retaining means for the marking device associated with the weighing means to be released thereby when the article is of proper weight, resilient actuating means operative to move the marker into contact with the article and connections from the housing door to the marker operative to reset the marker when the door is opened and when in open position to prevent the operation of the marker substantially as described.

12. An apparatus for the marking of articles of proper weight comprising weighing means and a marking device associated therewith, electro-magnetic means for controlling the operation of the marking device, an energizing circuit therefor, a movable contact member in said circuit connected with a movable part of the weighing means to be positioned thereby and coacting contact piece adapted to be engaged by said movable contact when correctly positioned and one of said contacts being adjustable for setting to operate at different weights and means for protecting the weighing means from manipulation during the operation of the marking device, substantially as described.

In testimony whereof I have signed my name to this specification.

BEIRNE GORDON, Jr.

Copies of this patent may be obtained for five cents each, by addressing the "Commissioner of Patents, Washington, D. C."